US011440430B2

(12) United States Patent
Bernhardt (10) Patent No.: US 11,440,430 B2
(45) Date of Patent: Sep. 13, 2022

(54) REMOVABLE BATTERY COMPRESSION DEVICES

(71) Applicant: THE BOEING COMPANY, Chicago, IL (US)

(72) Inventor: Roger D. Bernhardt, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 806 days.

(21) Appl. No.: 16/399,562

(22) Filed: Apr. 30, 2019

(65) Prior Publication Data

US 2020/0346555 A1 Nov. 5, 2020

(51) Int. Cl.
*B60L 53/80* (2019.01)
*B64C 39/02* (2006.01)
*H01M 10/04* (2006.01)
*H02J 7/00* (2006.01)
*H01M 10/44* (2006.01)
*H01M 50/20* (2021.01)

(52) U.S. Cl.
CPC ............ *B60L 53/80* (2019.02); *B64C 39/024* (2013.01); *H01M 10/0468* (2013.01); *H01M 10/44* (2013.01); *H01M 50/20* (2021.01); *H02J 7/0068* (2013.01); *B60L 2200/10* (2013.01); *B64C 2201/042* (2013.01); *H01M 2220/20* (2013.01)

(58) Field of Classification Search
CPC .... B60L 53/80; B60L 2200/10; H01M 50/20; H01M 10/0468; H01M 10/44; H01M 2220/20; H01M 10/04; B64C 39/024; B64C 2201/042; B64C 39/02; H02J 7/0068; H02J 7/00
See application file for complete search history.

(56) References Cited

U.S. PATENT DOCUMENTS

| 6,255,015 B1 | 7/2001 | Corrigan et al. |
| 8,006,793 B2 | 8/2011 | Heichal et al. |
| 8,967,529 B1 | 3/2015 | Bennett |
| 2018/0145293 A1 | 5/2018 | DeKeuster et al. |

FOREIGN PATENT DOCUMENTS

| CN | 106240798 A | 12/2016 |
| DE | 102015210122 A1 | 12/2016 |

OTHER PUBLICATIONS

European Patent Office Extended European Search Report for Application No. 20159755.6-1010 dated Sep. 28, 2020.

*Primary Examiner* — Robert L Deberadinis
(74) *Attorney, Agent, or Firm* — Patterson + Sheridan, LLP (57) ABSTRACT

Certain aspects of the present disclosure provide a vehicle, comprising: a housing; a battery comprising a plurality of layers and disposed within the housing; and a first removable battery compression device disposed within the housing and configured to apply compressive force to the plurality of layers of the battery via a first side of the battery.

20 Claims, 5 Drawing Sheets

REMOVABLE BATTERY COMPRESSION DEVICES

STATEMENT OF GOVERNMENT INTEREST

The invention described herein was made in the performance of work under NASA Contract No. FA8650-18-S-2003 and is subject to the provisions of Section 305 of the National Aeronautics and Space Act of 1958 (72 Stat. 435; 42 U.S.C. 2457).

INTRODUCTION

Aspects of the present disclosure relate to removable battery compression devices, and in particular to removable battery compression devices that may be installed in aircrafts, such as aircraft wings, during battery transport and charging, and uninstalled prior to flight.

Batteries are susceptible to internal damage and wear during regular use, such as during charging and discharging. Batteries within vehicles are typically installed in a manner to restrain the battery, but not to apply compression to the battery. As such, batteries within vehicles may become damaged or worn during regular use.

BRIEF SUMMARY

Certain embodiments provide a provide a vehicle, comprising: a housing; a battery comprising a plurality of layers and disposed within the housing; and a first removable battery compression device disposed within the housing and configured to apply compressive force to the plurality of layers of the battery via a first side of the battery.

Further embodiments provide an unmanned aerial vehicle (UAV), comprising: a fuselage; a plurality of joinable wing segments, wherein: a first joinable wing segment of the plurality of joinable wing segments is joined to the fuselage, a second joinable wing segment of the plurality of joinable wing segments is joined to the fuselage, each joinable wing segment of the plurality of joinable wing segments comprises: a housing; a battery comprising a plurality of layers and disposed within the housing; and a first removable battery compression device disposed within the housing and configured to apply compressive force to the plurality of layers of the battery via a first side of the battery.

Further embodiments provide a method of using a removable battery compression device, comprising: installing a removable battery compression device in a vehicle; charging a battery comprising a plurality of planar layers compressed by the removable battery compression device; removing the removable battery compression device from the vehicle; and operating the vehicle using power from the battery after removing the removable battery compression device from the vehicle.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide removable battery compression devices suitable for use in crafts, such as aircrafts.

Various types of batteries are constructed with layered internal structures, such as, for example: anode, cathode, isolators, and separation layers. The performance of a battery may be particularly sensitive to the state of its internal layers. For example, if a battery's layers become separated by physical and/or chemical changes to the layers, the battery's performance will degrade.

Rechargeable batteries are particularly susceptible to layer state degradation because repetitive charging and discharging—especially at high current levels—creates heat and dynamics that in-turn causes physical stresses on the batteries' layers as well as chemical changes within the layer structures. For example, high-speed charging of a battery may cause gas bubbles to form between layers, thus displacing the layers from uniform contact with each other. Such changes are generally irreparable, and so a battery's service life may be significantly shortened by normal use.

Compressing a battery, such that its layers are less prone to deformation, may significantly improve the performance and service life of the battery. For example, compressing a battery during charging may significantly improve the battery's resilience to the stress created by charging and thus allow the battery to go through many more charge cycles before replacement. In some cases, sufficient compression may improve a battery's charge cycle capacity from tens of charges to hundreds or even thousands of charges. Not only does this improve the useful life of the battery (and whatever is powered by the battery), but it reduces the need to change the battery, which may be especially beneficial when the battery is integrated into a craft in such a way that replacement is expensive and laborious.

Batteries are increasingly used in craft for both primary power sources (e.g., in unmanned aerial vehicles) and for back-up, auxiliary, or accessory power. In crafts of all sorts, and especially in aircraft, weight reduction generally improves performance. However, adding permanent structures or devices to crafts to optimally compress batteries to obtain the aforementioned battery performance improvements comes at the cost of additional weight, which may hinder the performance of the craft.

Embodiments described herein relate to removable battery compression devices that may be installed in a craft during certain times, such as when the craft is being transported or charged, and removed during other times, such as when the craft is being operated, especially when flown.

For example, a portable unmanned aerial vehicle (UAV) may have removable battery compression devices installed during storage, transport, and charging to prevent damage to the battery, but removed during flight of the UAV to improve flight characteristics, such as range and agility. In such embodiments, the UAV may have wings (and other components) that are separable into multiple segments to improve portability, and the removable battery compression devices may be configured to fit within wing segments of the UAV. In particular, where each wing segment separates, there may be access to an internal volume of the wing in which a removable battery compression device may be easily installed and uninstalled. The same design configuration may be used for other aircraft components, such as separable fuselage sections.

However, a craft need not be portable or easily separable to take advantage of the removable battery compression devices described herein. Rather, a craft only need a way to access a space adjacent to an installed battery in order to install and remove the removable battery compression devices. For example, traditional aircraft may have access panels in wings or fuselage sections that allow for installation and removal of the removable battery compression devices described herein. Similarly, land or water-based electric vehicles may have access panels for installation and removal of the removable battery compression devices. While many examples described herein relate to aircraft, the principles described herein are broadly applicable to different types of crafts.

Example Removable Battery Compression Device Implementations

Figure 1:
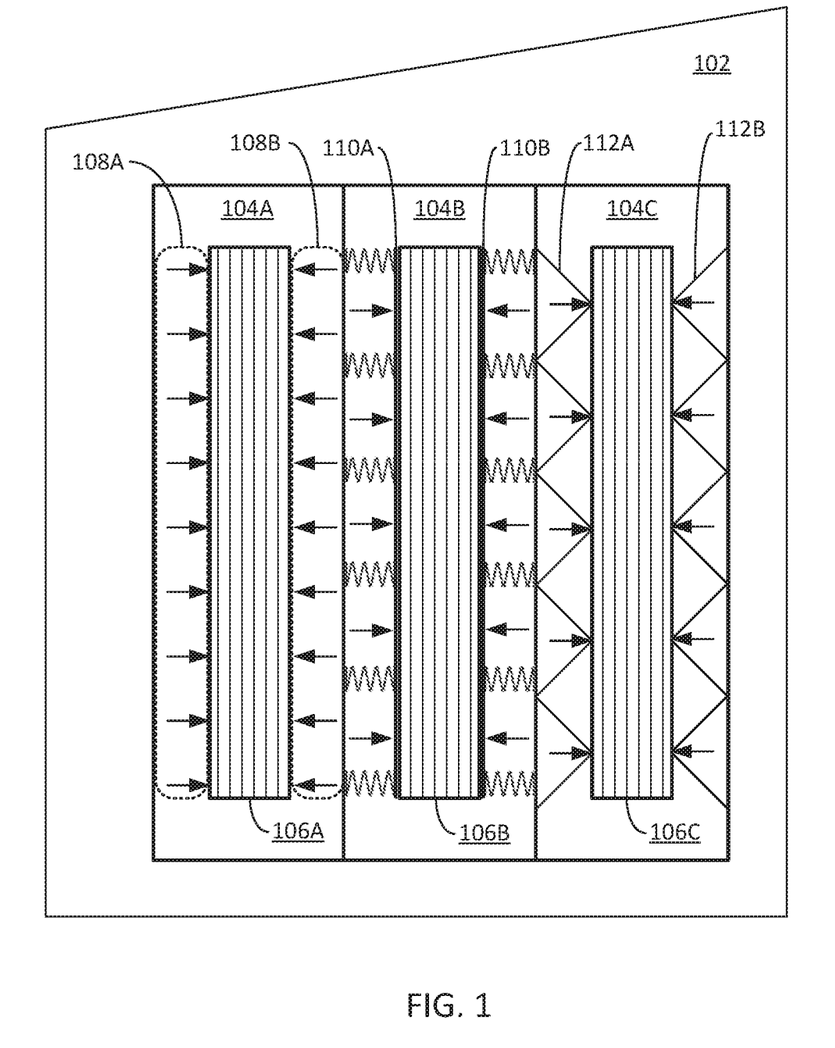
FIG. 1 depicts examples of removable compression devices within a wing assembly.

FIG. 1 depicts examples of removable compression devices within a wing.

In particular, wing 102 is depicted as having a plurality of cells or housings 104A-C in which batteries 106A-C are placed. In this example, each of housings 104A-C depicts a different sort of removable battery compression device to demonstrate various ways compression of a battery may be accomplished. In other embodiments, the same types of removable compression devices may be used in all or a subset of housings 104A-C (and other housings that are not depicted in FIG. 1).

Housing 104A includes battery 106A, which has a layered structure as depicted. In this example, removable battery compression devices 108A and 108B comprise inflatable (e.g., with air or fluid) bladders that press against the walls of housing 104A and apply compression to battery 106A as indicated by the arrows. For example, removable compression devices 108A and 108B may be installed in a deflated condition for ease and then inflated within housing 104A to a set pressure (e.g., in pounds per square inch or the like) in order to compress battery 106A in directions perpendicular to the layers of battery 106A. In this example, the layers of battery 106A are planar and arranged in parallel to each other. Because removable compression devices 108A and 108B may be removed (i.e., uninstalled) before flight, battery 106A may be attached or affixed within housing 104A by appropriate means, such as fastening hardware, straps, adhesives, hook-and-loop type fasteners, and the like.

Note that while battery 106A is depicted in this example as shorter than the length of housing 104A, in other implementations, battery 106A, as well as batteries 106B and 106C, may be equal to or approximately equal to the inner length dimension of housing 104A.

Housing 104B includes battery 106B, which has a layered structure as depicted. In this example, removable battery compression devices 110A and 110B comprise spring-biased plates wherein the springs press against the walls of housing 104B and apply compression to battery 106B by way of the attached plates as indicated by the arrows. The plates attached to the springs may create a more even force distribution across the compressed surface of battery 106B as compared to the springs alone. The springs attached to the plates may be any sort of compression spring, such as conical, hourglass, barrel, constant pitch, variable pitch, and helical compression springs, wave springs, round wire springs, belleville springs, recurve or curved strip springs, and others, or torsion springs. As above, because removable compression devices 110A and 110B may be removed before flight, battery 106B may be attached or affixed within housing 104B by appropriate means, such as those described above.

Housing 104C includes battery 106C, which has a layered structure as depicted. In this example, removable battery compression devices 112A and 112B comprise biasing members 112A and 112B, pressing against the walls of housing 104C and applying compression to battery 106C by way of the multiple interface points between biasing members 112A and 112B and battery 106C. The biasing members of removable battery compression devices 112A and 112B may comprise springs, such as those described above. In this example, however, the biasing members are not attached to a compression plate as with those in housing 104B.

Though several different types of compression devices are shown with respect to housings 104A-C, still others are possible. For example, the removable battery compression devices may include threaded compression rods, pneumatic or hydraulic pistons (individually or attached to a compression plate), foam or rubber inserts, opposing straps, other packing materials, and the like.

Removable battery compression devices 108A-B, 110A-B, and 112A-B may all be installed when charging batteries 106A-C and when storing or transporting the craft to which wing 102 is attached. In this way, removable battery compression devices 108A-B, 110A-B, and 112A-B may improve the durability of batteries 106A-C as well as providing reinforcing structures to prevent damage to batteries 106A-C.

Batteries 106A-106C may be used for various purposes, such as for powering electric propulsion system components (e.g., electric motors), or for powering ancillary or back-up systems, such as providing backup power to avionics systems, fly-by-wire electric actuators, electric pumps for hydraulic systems, safety systems, lighting systems, communication systems, and others.

Though not depicted in FIG. 1 for simplicity, housings 104A-104C may include additional components, such as electrical connections for batteries 106A-C, electronic devices, such as sensors, and the like.

Figure 2:
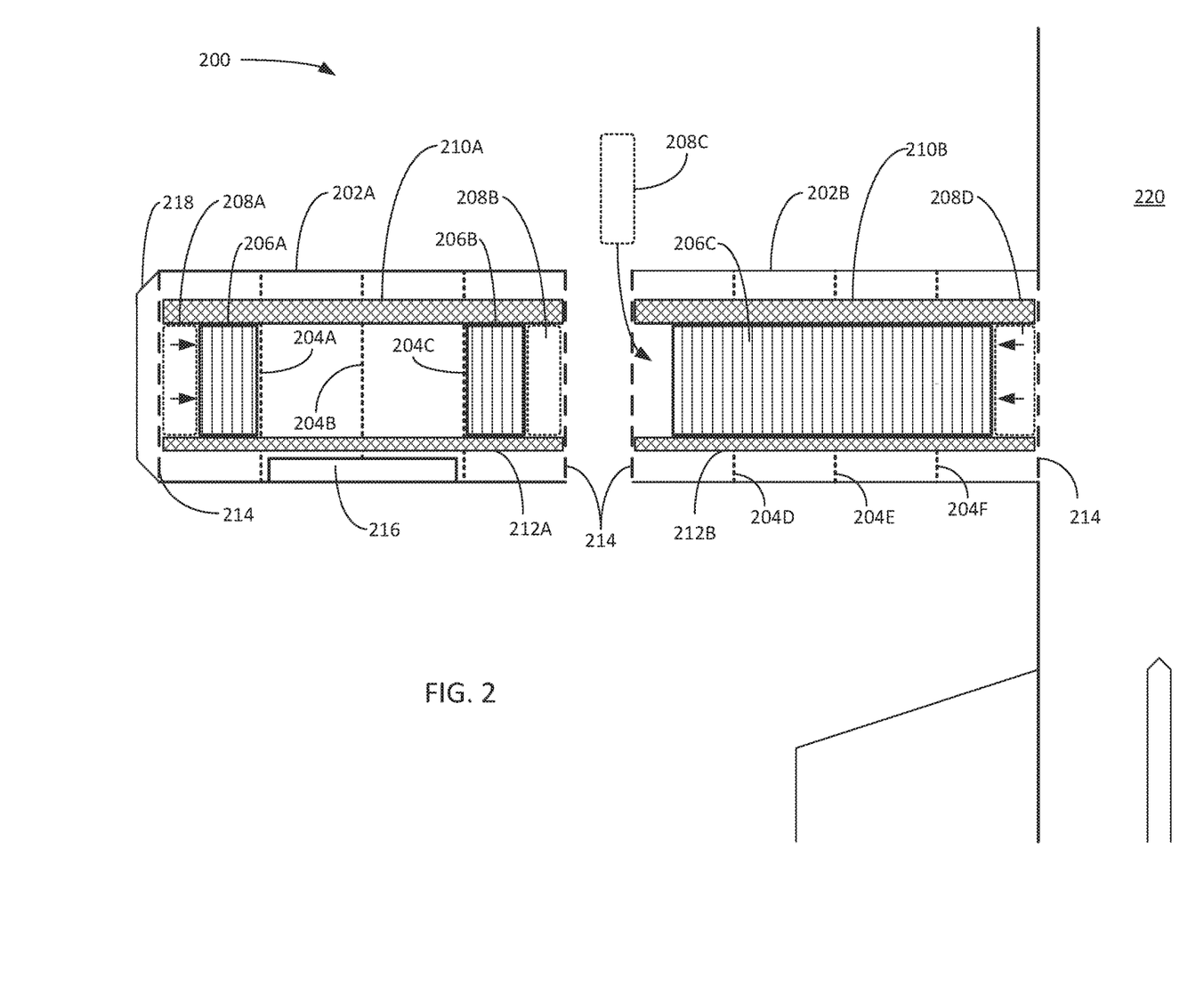
FIG. 2 depicts an example of modular wing segments comprising batteries and removable battery compression devices.

FIG. 2 depicts an example of modular wing segments (or subassemblies) comprising batteries and removable battery compression devices.

Multiple example types of modular wing segments are depicted in FIG. 2. For example, modular wing segment 202A includes an aerodynamic control surface 216 (e.g., an aileron). Modular wing segment 202A may be connected on joined to other modular wing segments or assemblies at attachment points 214. For example, modular wing segment 210 may be attached to a wing end cap 218 (or winglet in other implementations) and another modular wing segment 202B. Though not depicted in FIG. 2 for simplicity, modular wing segments such as 202A and 202B may include electrical connections (e.g., via connectors) that enable power and data flow between the wing segments and other systems within craft 200, which in this example is an aircraft.

In this example, modular wing segment 202A comprises a plurality of internal structural members, including ribs 204A-C, front wing spar 210A and rear wing spar 212A. The internal structural members may be used as part of a housing or otherwise as a structure for retaining and compressing a battery using removable battery compression devices, such as those described above with respect to FIG. 1.

For example, battery 206A, which includes a layered internal structure as depicted, may be installed, placed, retained, affixed, or otherwise located within modular wing segment 202A and supported, at least in part, by rib 204A on a first side, front wing spar 210A on a second side, and rear wing spar 212A on a third side. Additionally, removable battery compression device 208A may be placed against battery 206A on a fourth side and may provide compressive force on battery 206A as indicated by the arrows in the manners described above with respect to FIG. 1. For example, removable battery compression device 208A may include an inflatable bladder that can be installed and inflated to apply compression to battery 206A. In this example, removable battery compression device 208A may be supported on its end opposite battery 206A by wing endcap 218, or in other embodiments, by another modular structure attached to modular wing segment 202A. In this example, battery 206A is compressed in a direction along the span of modular wing segment 202A.

As another example, battery 206B, which also includes a layered internal structure as depicted, may also be installed within modular wing segment 202A and supported, at least in part, by rib 204C on a first side, front wing spar 210A on a second side, and rear wing spar 212A on a third side. Additionally, removable battery compression device 208B may be placed against battery 206B on a fourth side and may provide compressive force to battery 206B in the manners described above with respect to FIG. 1. As above, removable battery compression device 208B may include an inflatable bladder that can be installed and inflated to apply compression to battery 206B. In this example, removable battery compression device 208B may be supported on its end opposite battery 206B by wing a structural connection with modular wing segment 202B. In this example, battery 206B is also compressed in a direction along the span of modular wing segment 202A.

As yet another example, battery 206C, which also includes a layered internal structure as depicted, may be installed within modular wing segment 202B and supported, at least in part, by front wing spar 210B on a first side, and rear wing spar 212B on a second side. Additionally, removable battery compression devices 208C and 208D may be placed against battery 206C on third and fourth sides and may provide compressive force to battery 206C in the manners described above with respect to FIG. 1.

In this example, removable battery compression device 208C is shown removed to illustrate its removability. As above, removable battery compression devices 208C and 208D may include inflatable bladders that can be installed and inflated to apply compression to battery 206C. In this example, removable battery compression devices 208C may be supported on its end opposite battery 206C by a structural connection with modular wing segment 202A, and removable battery compression devices 208D may be supported on its end opposite battery 206C by a structural connection with the fuselage 220 of craft 200. In this example, battery 206C is likewise compressed in a direction along the span of modular wing segment 202A.

In modular wing segment 202B, battery 206C may be installed above, below, or through ribs 204D-F. In some embodiments, battery 206C may act as a structural element when installed within modular wing segment 202B and may obviate the need for ribs spanning the full chord of the wing segment 202B.

As depicted in FIG. 2, when modular wing segments 202A and 202B are separated, batteries 206A-C are easily installed or removed from their respective installation locations.

In some implementations, removable compression devices may be installed during transport, storage, and charging of wing segments with installed batteries, but removed before flight. For example, in FIG. 2, removable battery compression devices 208A-D may be removed before fully assembling the modular wing components and flying aircraft 200.

In some implementations, batteries 206A-C may be installed in such a way that the removal of removable battery compression devices 208A-D does not cause batteries 206A-C to move about during flight or other movement of aircraft 200. In other implementations, lightweight retaining elements (not shown) may replace the compression devices during operation of craft 200. For example, the retaining elements many be made of a lightweight foam or other durable, low-density material. While the retaining elements may not provide the level of compression of batteries 204A-C provided by removable battery compression devices 208A-D, they may nevertheless provide sufficient force to retain batteries 204A-C in place during flight or other movement of aircraft 200.

In the example depicted in FIG. 2, two modular wing segments, 202A and 202B, are shown as making up the wing structure for craft 200, but in other examples, any number of modular wing segments may be used. The modular wing segments may include attachment points (e.g., 214) for connecting different modular wing segments and additional structural elements (not shown) may further attach structural elements within each modular wing segment, such as elements for linking front spars 210A and 210B and rear spars 212A and 212B. Thus, when linked together, modular wing elements may form a structurally sound wing for craft 200.

Figure 3A:
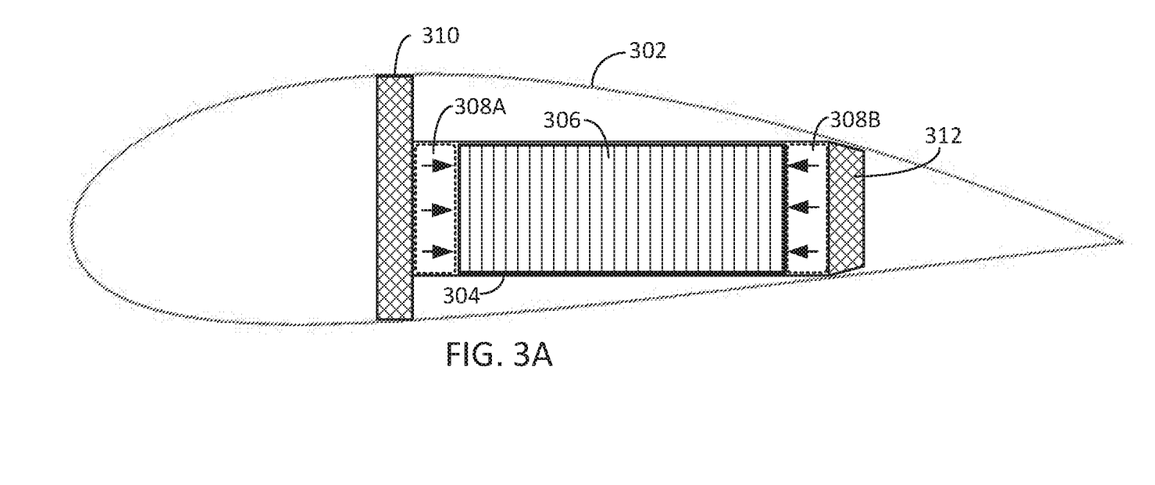
FIGS. 3A and 3B depict examples of removable battery compression devices installed within wing cross-sections.
Figure 3B:
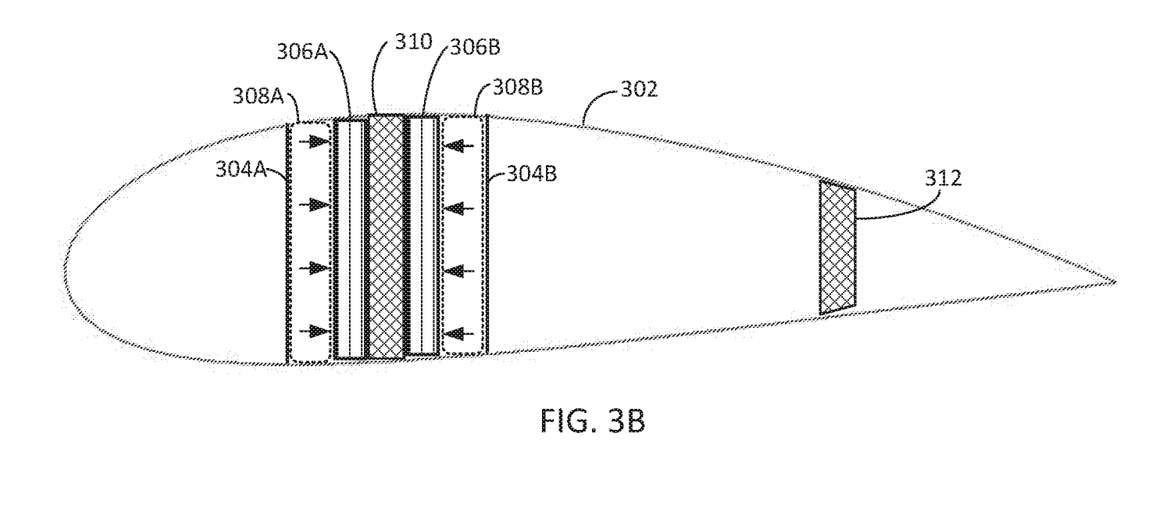

FIGS. 3A and 3B depict examples of removable battery compression devices installed within wing cross-sections.

In FIG. 3A, a battery 306 with a layered internal structure as depicted is located within a cross section of wing 302 and within housing 304 between front spar 310 and rear spar 312. In this example, removable battery compression device 308A is located between front spar 310 and battery 306 and provides compressive force on battery 306 as indicated by the arrows. Removable battery compression device 308B is further located between rear spar 312 and battery 306 and provides compressive force on battery 306 as indicated by the arrows. Thus, in this example, battery 306 is compressed along the chord of wing 302.

While not shown in FIG. 3A, additional structures (e.g., walls of housing 304, ribs, or the like) may retain battery 306 from moving laterally along the span of wing 302.

In FIG. 3B, a battery 306A with a layered internal structure as depicted is located within a cross section of wing 302 between front spar 310 and retaining wall 304A, which may form part of a housing. In this example, removable battery compression device 308A is located between retaining wall 304A and battery 306A and provides compressive force on battery 306A as indicated by the arrows. Thus, in this example, battery 306A is compressed along the chord of wing 302.

Similarly, battery 306B, with a layered internal structure as depicted, is located within a cross section of wing 302 between front spar 310 and retaining wall 304B, which may form part of a housing. In this example, removable battery compression device 308B is located between retaining wall 304B and battery 306B and provides compressive force on battery 306B as indicated by the arrows. Thus, in this example, battery 306B is also compressed along the chord of wing 302.

While not shown in FIG. 3B, additional structures (e.g., additional retaining walls, ribs, or the like) may retain batteries 306A and 306B from moving laterally along the span of wing 302. Further, though not shown in FIG. 3B, a similar arrangement of structures to compress additional batteries may be configured around rear spar 312.

Figure 4:
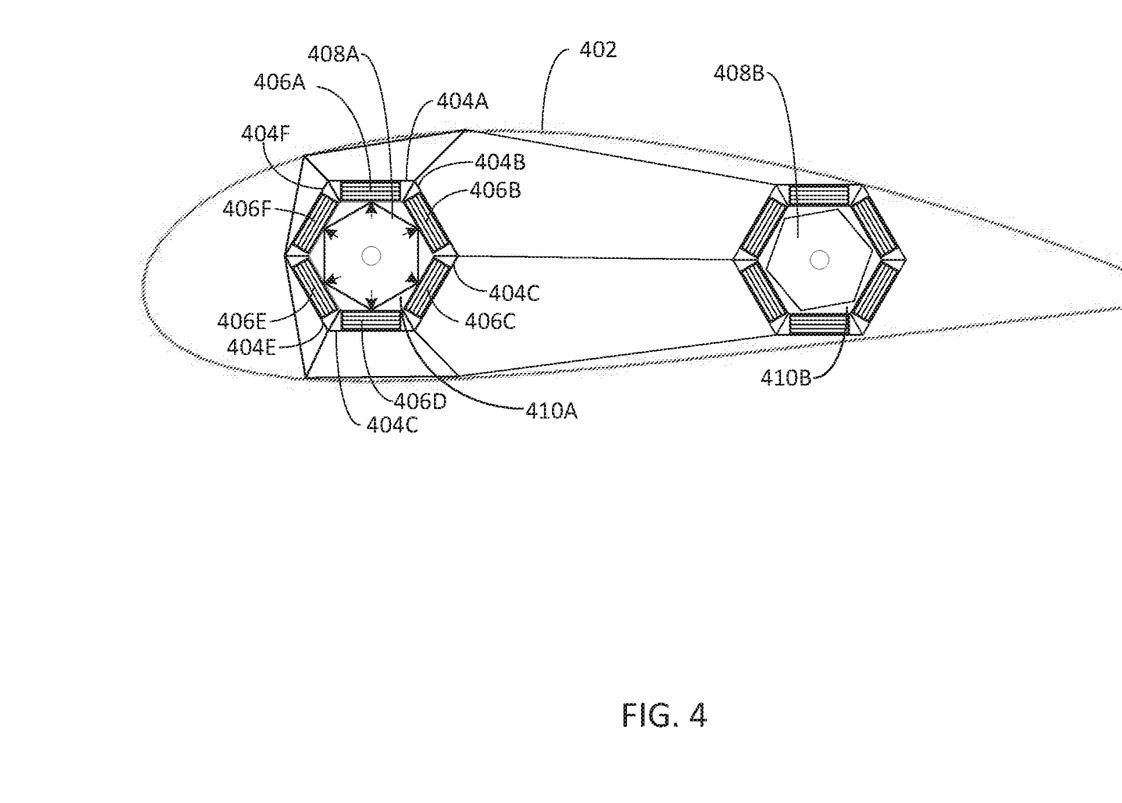
FIG. 4 depicts another example of removable battery compression devices within a wing.

FIG. 4 depicts another example of removable battery compression devices within a wing.

In this example, removable battery compression devices 408A and 408B are hollow extrusions with a hexagonal cross-section, which, when rotated to different positions, apply or do not apply compressive force to batteries arranged around the removable devices. Notably, while hexagonal in this example, removable battery compression devices 408A and 408B could have different cross-sections in other implementations, such as other polygonal cross-sections with more or fewer points, or other cross-section geometries altogether (e.g., lobed).

In the depicted example, removable battery compression device 408A is rotated such that the six points of its cross-section are pressing on a wall of six corresponding battery housings 404A-404F containing six respective batteries 406A-F with layered internal structures as depicted. In this case, the walls of battery housings 404A-404F adjacent to removable battery compression device 408A may be flexible or movable so as to transmit force from the points of removable battery compression device 408A to batteries 406A-F stored therein (as indicated by the force arrows).

Though not depicted in FIG. 4, in some implementations the points of removable battery compression device 408A may engage with notches or other structures on the walls of battery housings 404A-404F adjacent to removable battery compression device 408A in order to hold removable battery compression device 408A in place when in a compression providing arrangement.

Removable battery compression device 408B is shown in an alternative arrangement where no-compression is provided to the adjacent battery housings. In this arrangement, removable battery compression device 408B may be easily removed, thereby saving weight before flight of an aircraft attached to wing 402. Further, without compression applied to the batteries, the batteries may be easily removed from the housings as well.

In the example depicted in FIG. 4, the inner walls of the battery housings (e.g., 404A-F) make up a channel with a cross-section having the same number of segments as the removable battery compression devices (408A and 408B). In other words, in this example, the channels 410A and 410B also have hexagonal cross-sections that correspond to, but are larger than, the cross sections of removable battery compression devices 408A and 408B. In other examples, the geometric shape of the cross-sections of the removable battery compression devices (e.g., 408A and 408B) may be different than that of the channels (e.g., 410A and 410B) in which the removable battery compression devices are installed.

Example Method for Using Removable Battery Compression Device

Figure 5:
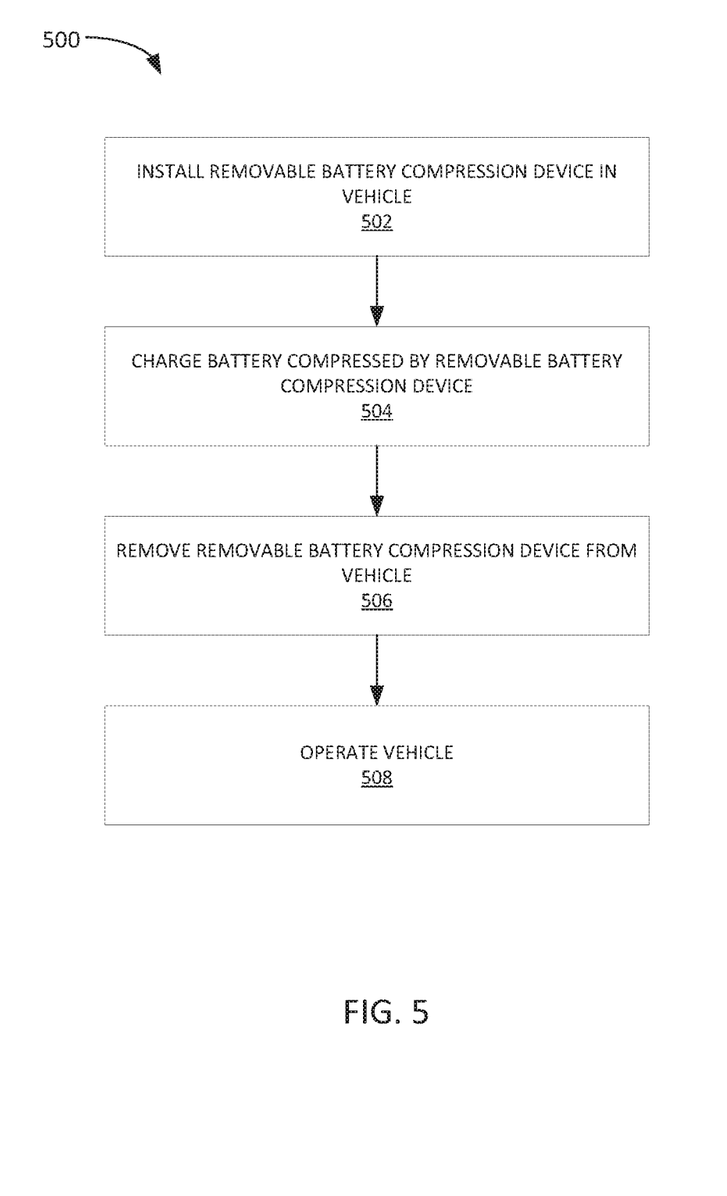
FIG. 5 depicts an example method for using removable battery compression devices, as discussed herein.

FIG. 5 depicts an example method 500 for using removable battery compression devices, as discussed herein.

Method 500 begins at step 502 with installing one or more removable battery compression devices in a vehicle, for example, as described above with respect to FIGS. 1, 2, 3A, 3B, and 4.

Method 500 then proceeds to step 504 with charging one or more batteries compressed by the one or more removable battery compression devices.

Method 500 then proceeds to step 506 with removing the one or more removable battery compression devices from the vehicle.

Method 500 then proceeds to step 508 with operating the vehicle. Operating the vehicle may include operating aspects of the vehicle from electric power stored in the battery.

Though not depicted in FIG. 5, method 500 may include additional and/or alternative steps in other examples.

For example, method 500 may include transporting and/or storing the vehicle with the battery compression devices installed.

As another example, method 500 may include engaging the removable battery compression device(s) after installation, such as by inflating the device(s), changing an orientation of the device(s), or otherwise causing the device(s) to apply pressure to an adjacent battery.

As another example, method 500 may include operating one or more systems of the vehicle, such as a propulsion system or an ancillary or back-up system (as described above), using the power stored in the battery(ies).

EXAMPLE EMBODIMENTS

The following are example embodiments. Notably, the reference numerals in the examples below are merely examples. Further, even if single claim dependencies are indicated in the following examples, or in the claims below, all claim dependencies, including multiple claim dependencies, are included within the scope of the present disclosure.

Embodiment 1

A vehicle, comprising: a housing (104); a battery (106) comprising a plurality of layers and disposed within the housing (104); and a first removable battery compression device (108) disposed within the housing (104) and configured to apply compressive force to the plurality of layers of the battery (106) via a first side of the battery (106).

Embodiment 2

The vehicle of Embodiment 1, wherein the first removable battery compression device comprises an inflatable bladder (108A).

Embodiment 3

The vehicle of Embodiment 1, wherein the first removable battery compression device comprises one or more springs (110A, 112A).

Embodiment 4

The vehicle of Embodiment 3, wherein the first removable battery compression device comprises a plate attached to the one or more springs (110A).

Embodiment 5

The vehicle of Embodiment 1, wherein the first removable battery compression device comprises a hollow extrusion with a polygonal cross-section (408).

Embodiment 6

The vehicle of any of Embodiments 1-5, wherein the housing is disposed within a wing of the vehicle.

Embodiment 7

The vehicle of any of Embodiments 1-6, further comprising: a second removable battery compression device (108) disposed within the housing (104) and configured to apply compressive force to the plurality of layers of the battery via a second side of the battery (106).

Embodiment 8

The vehicle of Embodiment 6, wherein at least one wall of the housing comprises a structural element of the wing (102).

Embodiment 9

The vehicle of Embodiment 8, wherein the structural element is one of a wing spar (210, 212) or a wing rib (204).

Embodiment 10

The vehicle of any of Embodiments 6-9, wherein the first removable battery compression device is configured to apply the compressive force to the plurality of layers of the battery in a direction along a span of the wing (102).

Embodiment 11

The vehicle of any of Embodiments 6-9, wherein the first removable battery compression device is configured to apply the compressive force to the plurality of layers of the battery in a direction along a chord of the wing (102).

Embodiment 12

The vehicle of any of Embodiments 6-11, wherein: the wing comprises a plurality of joinable segments (202), the housing (104) is disposed within one joinable segment of the plurality of joinable segments, and each segment of the plurality of joinable segments (202) comprises a power connector configured to enable power flow from one segment of the plurality of joinable segments to one of: another segment of the plurality of joinable segments, or a fuselage (220) of the vehicle.

Embodiment 13

An unmanned aerial vehicle (UAV), comprising: a fuselage (220); a plurality of joinable wing segments (202), wherein: a first joinable wing segment of the plurality of joinable wing segments is joined to the fuselage (220), a second joinable wing segment of the plurality of joinable wing segments is joined to the fuselage (220), each joinable wing segment of the plurality of joinable wing segments (202) comprises: a housing (204); a battery (206) comprising a plurality of layers and disposed within the housing (204); and a first removable battery compression device (208) disposed within the housing (204) and configured to apply compressive force to the plurality of layers of the battery (206) via a first side of the battery (206).

Embodiment 14

The UAV of Embodiment 13, wherein the first removable battery compression device within each joinable wing segment of the plurality of joinable wing segments comprises an inflatable bladder (208A).

Embodiment 15

The UAV of Embodiment 13, wherein the first removable battery compression device within each joinable wing segment of the plurality of joinable wing segments comprises one or more springs (110A, 112A).

Embodiment 16

The UAV of Embodiment 15, wherein the first removable battery compression device within each joinable wing segment of the plurality of joinable wing segments comprises a plate attached to the one or more springs (110A).

Embodiment 17

The UAV of any of Embodiments 13-16, further comprising, within each joinable wing segment of the plurality of joinable wing segments (202): a second removable battery compression device (208) disposed within the housing (204) and configured to apply compressive force to the plurality of layers of the battery via a second side of the battery (206).

Embodiment 18

The UAV of any of Embodiments 13-17, wherein at least one wall of the housing within each respective joinable wing segment of the plurality of joinable wing segments (202) comprises a structural element of the respective joinable wing segment wing.

Embodiment 19

A method of using a removable battery compression device, comprising: installing (502) a removable battery compression device (208) in a vehicle (200); charging (504) a battery (206) comprising a plurality of planar layers compressed by the removable battery compression device; removing (506) the removable battery compression device (208) from the vehicle (200); and operating (508) the vehicle using power from the battery (206) after removing the removable battery compression device (208) from the vehicle (200).

Embodiment 20

The method of Embodiment 19, wherein the removable battery compression device (208) is installed within a housing (204) in a segment (202) of a wing of the vehicle (200).

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A vehicle, comprising:
a housing;
a battery comprising a plurality of layers and disposed within the housing; and
a first removable battery compression device disposed within the housing and configured to apply compressive force to the plurality of layers of the battery via a first side of the battery.

2. The vehicle of claim 1, wherein the first removable battery compression device comprises an inflatable bladder.

3. The vehicle of claim 1, wherein the first removable battery compression device comprises one or more springs.

4. The vehicle of claim 3, wherein the first removable battery compression device comprises a plate attached to the one or more springs.

5. The vehicle of claim 1, wherein the first removable battery compression device comprises a hollow extrusion with a polygonal cross-section.

6. The vehicle of claim 1, wherein the housing is disposed within a wing of the vehicle.

7. The vehicle of claim 1, further comprising: a second removable battery compression device disposed within the housing and configured to apply compressive force to the plurality of layers of the battery via a second side of the battery.

8. The vehicle of claim 6, wherein at least one wall of the housing comprises a structural element of the wing.

9. The vehicle of claim 8, wherein the structural element is one of a wing spar or a wing rib.

10. The vehicle of claim 6, wherein the first removable battery compression device is configured to apply the compressive force to the plurality of layers of the battery in a direction along a span of the wing.

11. The vehicle of claim 6, wherein the first removable battery compression device is configured to apply the compressive force to the plurality of layers of the battery in a direction along a chord of the wing.

12. The vehicle of claim 6, wherein:
the wing comprises a plurality of joinable segments,
the housing is disposed within one joinable segment of the plurality of joinable segments, and
each segment of the plurality of joinable segments comprises a power connector configured to enable power flow from one segment of the plurality of joinable segments to one of: another segment of the plurality of joinable segments, or a fuselage of the vehicle.

13. An unmanned aerial vehicle (UAV), comprising:
a fuselage;
a plurality of joinable wing segments, wherein:
a first joinable wing segment of the plurality of joinable wing segments is joined to the fuselage,
a second joinable wing segment of the plurality of joinable wing segments is joined to the fuselage,
each joinable wing segment of the plurality of joinable wing segments comprises:
a housing;
a battery comprising a plurality of layers and disposed within the housing; and
a first removable battery compression device disposed within the housing and configured to apply compressive force to the plurality of layers of the battery via a first side of the battery.

14. The UAV of claim 13, wherein the first removable battery compression device within each joinable wing segment of the plurality of joinable wing segments comprises an inflatable bladder.

15. The UAV of claim 13, wherein the first removable battery compression device within each joinable wing segment of the plurality of joinable wing segments comprises one or more springs.

16. The UAV of claim 15, wherein the first removable battery compression device within each joinable wing segment of the plurality of joinable wing segments comprises a plate attached to the one or more springs.

17. The UAV of claim 13, further comprising, within each joinable wing segment of the plurality of joinable wing segments: a second removable battery compression device disposed within the housing and configured to apply compressive force to the plurality of layers of the battery via a second side of the battery.

18. The UAV of claim 13, wherein at least one wall of the housing within each respective joinable wing segment of the plurality of joinable wing segments comprises a structural element of the respective joinable wing segment wing.

19. A method of using a removable battery compression device, comprising:

installing a removable battery compression device in a vehicle;

charging a battery comprising a plurality of planar layers compressed by the removable battery compression device;

removing the removable battery compression device from the vehicle; and operating the vehicle using power from the battery after removing the removable battery compression device from the vehicle.

20. The method of claim 19, wherein the removable battery compression device is installed within a housing in a segment of a wing of the vehicle.

\* \* \* \* \*